3,846,310
HYDRAULIC FRACTURING METHOD USING
        GELLED HYDROCARBONS
Robert J. Blackwell and Donald M. Kehn, Houston, Tex.,
  and Thomas A. Whitney, Linden, N.J., assignors to
  Esso Production Research Company
        Filed Mar. 3, 1972, Ser. No. 231,525
              Int. Cl. E21b 43/26
U.S. Cl. 252—8.55 R                              16 Claims

ABSTRACT OF THE DISCLOSURE

A hydraulic fracturing method wherein a liquid hydrocarbon containing an oil-dispersible gelling agent is injected into a subterranean formation at a pressure sufficient to open a fracture in the formation. The gelling agent decomposes in the presence of formation water to return the liquid hydrocarbon to its ungelled condition. The gelling agent comprises an alkoxide of a Group IA metal and an alkoxide of a Group IIIA element.

BACKGROUND OF THE INVENTION

1. Field of the Invention

This invention relates to the hydraulic fracturing of subterranean formations surrounding oil wells, gas wells, water wells, injection wells and similar boreholes. In one aspect, it relates to a hydraulic fracturing method which employs an oil-base fracturing fluid.

2. Description of the Prior Art

Hydraulic fracturing has been widely used for stimulating the production of oil wells and gas wells. The method normally involves the injection of a fluid into the producing formation at a pressure and rate sufficient to form a fracture in the formation and the placement of a propping agent in the fracture to prevent the formation from closing. The propped fracture forms a highly conductive channel within the formation and alters the flow pattern of the well. The degree of stimulation of the well productivity is a function of the length, width, and permeability of the propped fracture.

The recent trend in hydraulic fracturing has been toward the use of viscous gelled fluids. These fluids exhibit low filter loss values and high friction loss within the fracture which permit the generation of wider and longer fractures than possible with low viscosity fluids. Moreover, the sand carrying ability of these fluids permits the placement of large sized proppants which result in high fracture permeability.

Gelled fluids using water and liquid hydrocarbons have been used extensively in the stimulation of wells by the hydraulic fracturing technique. The gelled waters are normally preferred over the gelled liquid hydrocarbons because of the availability, low cost, and ease of handling of materials useable in this type of fluid. However, gelled waters are unsuited for treating certain types of producing formations. Many formations contain water-sensitive clays which hydrate and swell in the presence of water. Formation plugging by these clays can more than offset the benefits gained from the fracturing treatment. Moreover, many of the gelled waters are not easily removed from the formation following the fracturing treatment. Water injected into certain types of formations not only has a plugging effect on the formation but also reduces the formation's relative permeability to gas or oil.

The removal of the fracturing fluid following the treatment is normally referred to as cleanup and relies upon the ability of the produced fluids to flush the fracturing fluid from the formation and propped fracture. Cleanup is a particularly serious problem in the treatment of gas wells because of the inability of the gas to completely flush the fluid from the interstices of the formation. Laboratory tests have shown that the water saturation in the invaded region cannot be easily reduced to the original connate water saturation of a gas producing formation when an aqueous fluid is employed as the fracturing fluid. The resulting increase in water saturation in the invaded region reduces the formation's relative permeability to gas.

Gelled hydrocarbons are generally preferred in the fracturing of formations containing water-sensitive clays and in the fracturing of gas producing formations where cleanup is likely to be a problem. Materials that have been used to gel hydrocarbon fracturing fluids include the soap-type gelling agents, normally referred to as napalm. The use of these gelling agents frequently produce a grease-like fluid which is difficult to handle and results in slow or incomplete cleanup. Moreover, they frequently required the use of a chemical breaker to return the gelled hydrocarbon to a low viscosity state. Because of the unsatisfactory performance of liquid hydrocarbons gelled with soaps, these fluids have not been widely used in fracturing operations in recent years.

Other gelling agents capable of gelling liquid hydrocarbons have been proposed for fracturing operations. However, many of these gelling agents are restricted to specific types of liquid hydrocarbons and frequently require the use of chemical breakers to return the gelled liquid to a low viscosity state. In the treatment of gas wells, liquid hydrocarbons gelled with many of the gelling agents currently available exhibit poor cleanup properties because of the inability of the gas to flush the liquid hydrocarbon from the formation.

SUMMARY OF THE INVENTION

The present invention provides an improved fracturing method which alleviates many of the difficulties associated with the hydraulic fracturing of gas producing formations or formations containing water-sensitive clays. The method involves the injection of a liquid hydrocarbon containing a gelling agent into a subterranean formation at a rate and pressure sufficient to open a fracture in the formation. Injection of the liquid hydrocarbon containing the gelling composition is continued until a fracture of sufficient dimensions is obtained to permit the placement of propping agent particles. Following the placement of the proppants, the injected fluids are permitted to leak off into the formation until the fracture is closed sufficiently to hold the propping agent particles in place. Thereafter, the fluids remaining in the fracture may be produced back into the wellbore. The gelling agent comprises a mixture of an alkoxide of a Group IA metal and an alkoxide of a Group IIIA element. The use of each of the gelling components in the absence of the other does not have the effect of gelling the liquid hydrocarbon, but when admixed in the liquid hydrocarbon, the apparent viscosity of the liquid is increased. The degree of viscosity increase may be controlled by the amount of gelling components added and the nature of the components used.

A particularly desirable property of the liquid hydrocarbon gelled with the two-component gelling agent is that formation water, i.e. connate water or water contained in the produced fluids, decomposes the gelling components returning the liquid hydrocarbon to its original, low viscosity state.

The alkoxide components of the gelling material may be represented by the general formulas MOR and $M'(OR')_3$ where M is a Group IA metal of the periodic system, preferably sodium or lithium, M' is a Group IIIA element of the periodic system, preferably boron or aluminum, and R and R' are each $C_1$ to $C_{25}$ hydrocarbon radicals. The periodic system referred to above is in accordance with the Periodic Table of Elements presented in *The Handbook of Chemistry and Physics*, published by The Chemical Rubber Co., 51st Edition, 1970–71.

The liquid hydrocaron used in the method may be aromatic or aliphatic including both saturated and unsaturated compounds, cyclic hydrocarbons and mixtures thereof. Tests have shown that the two-component gelling agent is capable of gelling virtually any type of liquid hydrocarbon provided that the liquid hydrocarbon contains only small amounts of water, alcohol or other polar materials. Preferred liquid hydrocarbons for use in the present invention include propane, butane, LPG, $C_5$–$C_{10}$ paraffin hydrocarbons, kerosene, condensate, diesel fuel oil, refined oil and mixtures thereof. In order to promote rapid cleanup, the liquid hydrocarbon should have a low viscosity, preferably less than about 5 centipoises at 80° F.

In the treatment of gas or condensate producing formations, it is preferred that the liquid hydrocarbon be volatile at reservoir conditions. During injection operations, the liquid hydrocarbon is under pressure and will retain its liquid state. But when the applied pressure is relieved, the liquid because of its high volatility will be transformed into a highly mobile vapor thereby promoting rapid well cleanup. Vaporization of the liquid is aided by the reduction in pressure in the immediate vicinity of the wellbore and by commingling of produced gas with the injected liquid. It should be observed that the vaporization of the liquid hydrocarbon and the decomposition of the gelling agent by formation water may both be operative in promoting rapid well cleanup.

The selection of specific volatile liquid hydrocarbons to be used in the fracturing operation according to one aspect of the present invention will depend upon formation pressure and temperature. For medium depth formations, LPG, propane, butane, pentane, condensate, etc. may be used. For deep, high temperature wells, the vapor pressure of kerosene, diesel fuel oil or other intermediate distillates may be sufficiently high to promote cleanup by the vaporization mechanism.

The alkoxides forming the two-component gelling agent decompose in the presence of water or certain alcohols. For this reason, it is necessary to use a liquid hydrocarbon containing only small amounts of water or alcohol. It has been found that by incorporating small amounts of drying agent in the liquid hydrocarbon, the system's tolerance for water can be increased. In general, any drying agent may be employed so long as it does not interact with the gelling reagents or the gel network once formed so as to quickly destroy the gel. The amount of drying agent employed should be sufficient to permit the liquid hydrocarbon to retain its gelled characteristic during injection but should not be so high as to prevent the decomposition of the gelling agent upon contact with formation water.

In preparing the gelled liquid hydrocarbon for fracturing operations, the gelling agent components can be introduced separately or together into the liquid hydrocarbon and mixed therein until the proper amount of gelling occurs. Preferably, however, the gelling components are dispersed in separate parts of the liquid hydrocarbon. These parts are then mixed to form the gelled liquid. The fracturing operation can be performed by a continuous injection method wherein the separate parts of the liquid hydrocarbon containing their respective gelling components are commingled during pumping operations. Alternatively, the separate parts of the liquid hydrocarbon can be intermixed at the surface prior to commencement of the injection operations.

DESCRIPTION OF THE PREFERRED EMBODIMENTS

Figure 4:
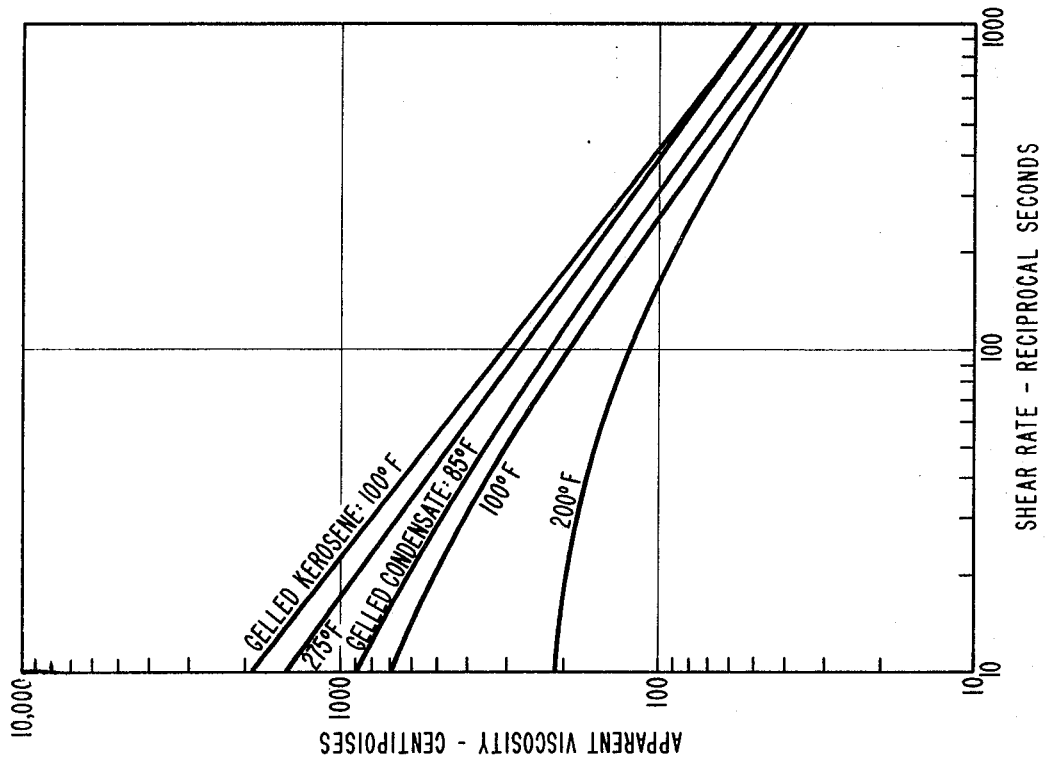
FIGS. 1, 2, 3 and 4 are plots showing the apparent viscosity versus shear rate relationship of various gelled liquid hydrocarbons.

The method of the present invention involves the use of a liquid hydrocarbon gelled with a gelling agent which decomposes in the presence of water. Although the method can be used to fracture any type of formation, its main benefit will be realized in the treatment of formations containing water-sensitive clays or formations producing gas or condensate. The liquid hydrocarbon useable in the invention can range from highly volatile liquid such as liquid petroleum gas (LPG), propane, butane, condensate, etc. to stable liquids such as diesel fuel oil, kerosene, refined oil, etc. The liquid hydrocarbon may be aromatic or aliphatic including both saturated and unsaturated compounds as well as cyclic hydrocarbons.

As is well known in the fracturing art, these liquid hydrocarbons are normally not suited for fracturing formations because of their low viscosity, high fluid loss characteristic, and poor sand suspension ability. Accordingly, such liquid hydrocarbons are normally gelled with a suitable gelling agent. As mentioned previously, the gelling agents of the prior art have not been particularly successful when employed in fracturing operations mainly because of the problems associated with removal of gelled hydrocarbons from the formation following the treatment.

The liquid hydrocarbon gelled by the two-component gelling agent described herein exhibits properties which satisfy most of the requirements of a fracturing fluid. A notable property of the gelled fluid is its sensitivity to water, which assures decomposition of the gelling agent upon contact with formation water. This feature promotes rapid well cleanup.

The two gelling components include two separate types of alkoxides represented by the general formulas MOR and $M'(OR')_3$ wherein M is a Group IA metal, M' is a Group IIIA element, and R and R' are each $C_1$ to $C_{25}$ hydrocarbon radicals. Both of the gelling components are necessary for imparting the desired viscosity to the liquid hydrocarbon. Extensive laboratory tests have shown that this two-component gelling agent is capable of gelling most any type of liquid hydrocarbon including propane, butane, LPG, pentane, heptane, benzene, toluene, methylcyclohexane, tetralin, decalin, jet fuel, gasoline, kerosene, condensate, diesel fuel oil, refined oil, and crude oil.

Specifically, the alkoxides of lithium, sodium, and potassium may be used as one of the gelling components, with the sodium and lithium alkoxides being preferred. The alkoxides of the Group IIIA elements which provide the other gelling component include borates and aluminates, with the borates being preferred. The hydrocarbon radicals R and R' are independently selected from $C_1$ through $C_{25}$ radicals. The $C_1$ through $C_{20}$ hydrocarbon radicals are preferred. These include $C_6$ through $C_{20}$ aryl radicals and $C_1$ through $C_{20}$ alkyl and alkenyl radicals. Specific aryl radicals include anthracene, naphthalene as well as $C_6H_5CH_2$ and $C_6H_5(CH_2)_n$ where $n=2$ to 14. Preferred alkyl and alkenyl radicals include $C_4$ to $C_{16}$ radicals. Preferred hydrocarbon radicals for the alkoxides of the Group IA metals include $C_8$ to $C_{16}$ alkyl radicals, either normal or branched; and the preferred hydrocarbon radicals for the alkoxides of the Group IIIA elements include $C_4$ to $C_8$ alkyl radicals, either normal or branched. Cyclo alkyl radicals and cyclo alkenyl radicals may also be utilized as the hydrocarbon radicals (R and R'). The cyclic radicals fall within the range of $C_3$ to $C_{15}$, preferably $C_5$ to $C_{10}$. Typical cyclic alkyl and alkenyl radicals which may be utilized include cyclopentyl and cyclohexyl.

Specific alkoxides useable in the present invention include lithium methoxide, $CH_3OLi$; lithium n-butoxide, n-$C_4H_9OLi$; lithium tert.-butoxide $(CH_3)_3COLi$; lithium n-octyl alkoxide, n-$C_8H_{17}OLi$; lithium 2-octyl alkoxide 2-$C_8H_{17}OLi$; lithium n-hexadecyl alkoxide, n-$C_{16}H_{33}OLi$; lithium cyclohexyl alkoxide, $C_6H_{11}OLi$; lithium 2-ethylhexyl alkoxide, $CH_3(CH_2)_3CH(CH_2CH_3)CH_2OLi$; lithium 2-methylpentyl alkoxide, $$CH_3(CH_2)_2CH(CH_3)CH_2OLi;$$

sodium tert.-butoxide, $(CH_3)_3CONa$; and sodium 2 - octyl alkoxide, 2 - $C_8H_{17}$ ONa. Also useable are alkoxides wherein the hydrocarbon radical comprises a mixture of straight chain or branched alkyl groups. Included in this class is a lithium alkoxide wherein the hydrocarbon radical is a mixture of $C_{12}$–$C_{14}$, and primarily $C_{13}$. Another highly useful alkoxide is a lithium alkoxide prepared from an isomeric mixture of a hexadecyl alcohol. The preferred alkoxides include lithium n-octyl alkoxide, lithium n-hexadecyl alkoxide, sodium 2-octyl alkoxide, and the lithium alkoxides prepared from the tridecyl alcohol and the hexadecyl alcohol described above.

Specific alkoxides of the Group IIIA elements useable in the present invention include trimethyl borate, $B(OCH_3)_3$; tri-n-propyl borate, $B(OC_3H_7)_3$; tri-isopropyl borate, $B[OCH(CH_3)_2]$; tri-n-butyl borate, $B(OC_4H_9)_3$; tri-n-hexyl borate, $B(OC_6H_{13})_3$; tri-n-hexadecyl borate, $B(OC_{16}H_{33})$; tri-2-octyl borate, $B(2-OC_8H_{17})_3$; tri-sec.-butyl aluminate $Al(O-sec.-C_4H_9)_3$; tri-isopropyl aluminate, $Al[OCH(CH_3)_2]_3$; and hexadecyl aluminate, $$Al(OC_{16}H_{33})_3,$$

with the tributyl and tripropyl borates being preferred.

The molar ratio of the two gelling components may be varied from 3:1 to 1:3 equivalents of the two types of alkoxides employed. Preferably a 1:1 molar ratio is employed.

The concentration of the gelling components employed in the liquid hydrocarbon will depend upon the viscosity desired but will normally be between about 0.25 and about 1.25 weight percent. For most applications, sufficient viscosity can be attained by the use of 1 weight percent or less of the two-component gelling agent. Preferably, a sufficient amount of the gelling components should be used to provide the liquid hydrocarbon with an apparent viscosity of at least 10 centipoises at 80° F. and a shear rate of 500 reciprocal seconds. The upper limit of the fluid viscosity will depend in part upon the size of the injection string and the amount of friction loss that can be tolerated during the injection operations. For small diameter injection strings or where the pressure limitations on the system prevent the use of high pressures, the viscosity normally should be less than about 200 centipoises at 80° F. and a shear rate of 500 reciprocal seconds. For large diameter injection strings, the fluid can have an apparent viscosity as high as 1000 centipoises at 80° F. and a shear rate of 500 reciprocal seconds. Viscosities in excess of this value present handling and pumping problems. Prior to the treatment of a particular well, laboratory tests should be run on the selected liquid hydrocarbon and the selected gelling agent components to determine optimum concentrations required to impart the desired properties to the fluid.

In the presence of water, the alkoxides decompose into alcohols and metal hydroxides. Therefore, the liquid hydrocarbons should be relatively free of water. Water can be removed by conventional dehydration methods such as azeotropic distillation or passing the liquid hydrocarbon through a drying agent such as a molecular sieve or a silica gel filter bed. It has been found, however, that the liquid system tolerance for water can be increased by the addition of a drying agent. Suitable drying agents include calcium chloride, zinc chloride, calcium oxide, barium oxide, phosphorus pentoxide, calcium sulfate, sodium sulfate, magnesium sulfate, sodium hydroxide, potassium hydroxide and boric anhydride. Because of their low cost, availability, and ease of handling, calcium chloride, calcium oxide and calcium sulfate are preferred drying agents. Tests using diesel fuel oil containing 1.0 volume percent of the two-component gelling agent have shown that water contents as low as 0.05 volume percent causes the alkoxides to decompose, but with 1.0 percent by weight of calcium chloride in the same system, the water tolerance can be increased to about 0.2 volume percent. Higher concentrations of the drying agent will further increase the system's tolerance for water. Of course, increasing the concentration of the gelling agent in the liquid hydrocarbon will also increase the system's tolerance for water. As a practical matter, the liquid hydrocarbon should contain less than about 0.5 volume percent water since water in excess of this would require excessive amounts of gelling agent or drying agent. The drying agents tend to combine with the water molecules and thus prevent them from reacting with the alkoxides. Use of the drying agent will also increase the system's tolerance for alcohol. The amount of the drying agent required will depend in part upon the type of materials used in the system and the concentration of the water or alcohol but normally will be between about 0.1 and 3.0 weight percent.

When employing a nonvolatile liquid such as diesel fuel oil, kerosene, crude oil, and in certain applications, condensate, the tanks, mixing equipment, and injection equipment may be conventional. Normally, the liquid hydrocarbon will be delivered to the well site in tank trucks and transferred to 200 or 500 barrel tanks open to the atmosphere. Because of the high sensitivity of the gelling agent components to water, the tanks should be thoroughly cleaned before use. If diesel fuel oil, kerosene, or condensate is used as the liquid hydrocarbon, a drying agent should be incorporated in the fluid since these materials generally contain some water.

The drying agent, if used, may be dispersed in the liquid hydrocarbon either prior to the introduction of the gelling agent components or after the liquid hydrocarbon has been gelled. Placing the drying agent in the gelled liquid hydrocarbon prevents premature decomposition of the gel during pumping operations. The mixing procedure for introducing the gelling agent components into the liquid hydrocarbon can be by a continuous process or by a batch process. In the continuous process, each of the gelling agent components is introduced and dispersed in the liquid hydrocarbon contained in separate tanks. The separate tanks are then connected in parallel to the injection equipment. During pumping operations, the solutions containing the separate gelling agent components are mixed. As the gelling agent components interact, the liquid hydrocarbon is transformed into a viscous liquid. During injection operations, particulate materials such as fluid loss additive, if used, and propping agents can be introduced in the conventional manner.

In the batch process, the gelling agent components are separately or as a premix introduced into the same volume of liquid and dispersed therein. Gelling thus occurs in the tanks prior to injection operations.

When employing a volatile liquid such as LPG, propane, butane, etc. as the fracturing fluid, the tanks should be pressure vessels designed to withstand the maximum pressure exerted by the volatile liquid. The storage, mixing, and pumping equipment employed should be such that the volatile liquid is maintained under pressure at all times. In handling these volatile liquids, it may be desirable to pump directly from the tank trucks in which the volatile liquid is transported to the well site. Particulate material such as fluid loss additives and propping agents can be introduced into the pressure system by using a liquid such as diesel oil, kerosense, or other liquid miscible with the volatile liquid hydrocarbon and compatible with the gelling agent components to form a dense slurry. This slurry can be pressurized and combined with the volatile liquid hydrocarbon. It also may be desirable to introduce each of the gelling agent components in separate volumes of volatile liquid hydrocarbon at the LPG, propane or butane loading plants. During fracturing operations, the separate volumes of liquid hydrocarbons can be intermixed and injected by the continuous process described above.

Alternatively, apparatus can be constructed to contain under pressure all of the materials including liquid hydrocarbon, additives, and gelling agent components to be injected into the well. A variation of this design is to provide a closed pressurized system for the fluid components and a solids conveying means for pressurizing and introducing the particulate material into the closed system. When using volatile liquids, the piping and other equipment in the system as well as transfer techniques should be in accordance with the recognized safety standards established for flammable gas.

The type of fluids, fluid volumes, additives and pumping schedule for a particular application will depend in part upon formation characteristics. Equations familiar to those skilled in the hydraulic fracturing art may be employed to determine the optimum fluid properties and injection volumes. As a general rule, the fracturing operations will proceed as follows.

The equipment piping and injection string are filled with lease crude or other liquid hydrocarbon and pressure tested. Following this, pumping operations are commenced. Initially, a volume of nonaqueous fluid, e.g. a liquid hydrocarbon, is pumped and injected into the formation to remove any water that might be present in the injection string. Following the preflush of nonaqueous fluid, a volume of liquid hydrocarbon gelled with the mixture of alkoxides described above is injected into the formation at the maximum permissible pressure. The injection rate is higher than the formation can receive causing the formation to fail in tension. The earth stresses in the vicinity of the formation are generally such that a vertical fracture forms. Continued injection of fluid increases the fracture length and width. A fluid loss additive, if used, is normally included in the fluid in a concentration between about 10 and 100 pounds per 1000 gallons. A suitable fluid loss additive for a liquid hydrocarbon is a powdered lime coated with an oil-soluble soap or sulfonate. It should be noted, however, that many of the high viscosity gelled fluids inherently exhibit low fluid loss values and therefore do not require fluid loss additives. When using a drying agent such as calcium chloride, calcium oxide, calcium sulfate, etc., a fluid loss additive may not be required since these finely powdered materials tend to plug the formation in the same manner as particulate fluid loss additives. The width of the fracture created by the injection of the gelled hydrocarbon should be sufficiently large to permit the placement of propping agent particles in the fracture.

The gelled liquid hydrocarbon containing suspended propping agent particles is then injected into the fracture. The propping agent particles can be silica sand, glass beads, walnut hulls, plastic pellets, steel shot, and the like. In most fracturing treatments, silica sand in a concentration between 1 and 10 pounds per gallon of fluid is used. The size of the propping agent particles is generally between about 8 and 60 mesh on the U.S. Standard Sieve Series, with the 10–20 and 20–40 mesh ranges being the most common. The final step in the injection operation is to displace gelled hydrocarbon containing suspended proppants from injection string into the formation using lease crude or other liquid hydrocarbon. The well is then shut in for a period ranging from about 8 to about 72 hours.

During the fracture propagation and the early part of the shut in period, the fluid in the fracture leaks off into the formation's matrix and contacts connate or interstitial water. As mentioned previously, the alkoxides used as the gelling agent components are highly sensitive to water and in their presence decompose into alcohols and hydroxides. Decomposition of the alkoxides returns the liquid hydrocarbon to its original low viscosity condition. Thus, when the well is placed on production following the shut in period, the liquid hydrocarbon can be readily flushed from the formation.

When empoying a volatile liquid hydrocarbon as the fracturing fluid, well cleanup is further promoted by vaporization of the liquid hydrocarbon. It should be noted that as used herein a volatile liquid hydrocarbon refers to any of the liquid hydrocarbons that vaporize at formation conditions, either static or dynamic flowing conditions. When it is desired to promote well cleanup by the vaporization mechanism, the liquid hydrocarbon selected should be such that it vaporizes at formation conditions. Under the applied injection pressure, the liquid hydrocarbon is maintained in the liquid state. However, as the applied pressure is removed, the liquid hydrocarbon vaporizes into a highly mobile gas. Vaporization can be accelerated by placing the well on production which reduces the pressure in the immediate vicinity of the wellbore. Moreover, produced gas commingling with the liquid hydrocarbon in the invaded region promotes vaporization of the liquid hydrocarbon.

The total volume of liquid hydrocarbon employed in the fracturing operation can vary within a wide range but normally will be between about 300 and 2000 barrels.

Several laboratory experiments have been conducted to determine the effectiveness of the gelling agent components in gelling a variety of liquid hydrocarbons. These experiments have shown that the gelling agent components, if properly selected and applied, can gel most any type of liquid hydrocarbon. The only limitation on the gelling ability of the gelling agent components appears to be the water and alcohol content of the liquid being gelled. Generally speaking, the water and alcohol content of the liquid hydrocarbon should be less than about 0.5 volume percent. Preferably, the liquid hydrocarbon is free of any undissolved water or alcohol.

Other laboratory tests have shown that certain liquid hydrocarbons gelled with the gelling agent components have rheological properties suited for fracturing operations. The liquid hydrocarbons investigated included diesel fuel oil, n-heptane, LPG, n-butane, kerosene, and condensate. The composition, concentration of each of the reagents used, and the rheological properties of the various fluid systems investigated are shown in the following table.

| Test number | Liquid hydrocarbon | Drying agent components | Gelling agent concentration | Drying agent | Drying agent concentration, weight percent | Apparent viscosity at 500 reciprocal seconds, cps. | Temp., °F. |
|---|---|---|---|---|---|---|---|
| 1 | Diesel oil | B(OC$_4$H$_9$)$_3$<br>2-C$_8$H$_{17}$OLi | 1.0 vol. percent | | | 175 | 80 |
| 2 | do | B(OC$_4$H$_9$)$_3$<br>C$_{13}$H$_{27}$OLi | 1.0 wt. percent | CaCl$_2$ | 1.0 | 150 | 80 |
| 3 | do | B(OC$_4$H$_9$)$_3$<br>C$_{13}$H$_{27}$OLi | 1.0 wt. percent | | | 160 | 80 |
| 4 | do | B(OC$_4$H$_9$)$_3$<br>C$_{13}$H$_{27}$OLi | 1.0 wt. percent | CaCl$_2$ | 1.0 | 160<br>90 | 77<br>200 |
| 5 | do | B(OC$_4$H$_9$)$_3$<br>n-C$_{16}$H$_{33}$OLi | 1.0 wt. percent | | | 170<br>75 | 75<br>200 |
| 6 | LPG | B(OC$_4$H$_9$)$_3$<br>2-C$_8$H$_{17}$OLi | 0.5 vol. percent | | | 13<br>10 | 105<br>150 |
| 7 | LPG | B(OC$_4$H$_9$)$_3$<br>2-C$_8$H$_{17}$OLi | 0.7 vol. percent | | | 52<br>34 | 105<br>180 |
| 8 | n-Butane | B(OC$_4$H$_9$)$_3$<br>2-C$_8$H$_{17}$OLi | 0.7 vol. percent | | | 65<br>48 | 100<br>230 |
| 9 | n-Heptane | B(OC$_4$H$_9$)$_3$<br>2-C$_8$H$_{17}$OLi | 1.0 vol. percent | | | 100<br>160 | 77<br>250 |
| 10 | Kerosene | B(OC$_4$H$_9$)$_3$<br>2-C$_8$H$_{17}$OLi | 0.7 vol. percent | | | 90<br>85 | 100<br>275 |
| 11 | Condensate | B(OC$_4$H$_9$)$_3$<br>2-C$_8$H$_{17}$OLi | 0.7 vol. percent | | | 62<br>54 | 100<br>200 |

The gelled liquid hydrocarbons were prepared by first introducing tributyl borate into a sample of the liquid hydrocarbon and shortly thereafter adding the lithium alkoxide. The samples were continuously stirred to ensure complete mixing of the components. In all but test number 5, equal molar concentrations of the two gelling components were used. In test number 5, equal weights of the components were used. All of the diesel fuel oil samples (Grade No. 2-D) were passed through the molecular sieve prior to the addition of the gelling agent components.

The LPG used in test numbers 6 and 7 consisted primarily of propane and n-butane with minor amounts of ethane and iso-butane. The condensate sample of test number 11 had an AP Gravity of 50.

The lithium alkoxides used in test numbers 2, 3 and 4 were prepared from tridecyl alcohol purchased from Enjay Chemical Company.

The rheological properties of the gelled diesel fuel oil, heptane, kerosene and condensate samples were measured on a rotational viscometer (Fann V-G Meter) at various rotational speeds. For the volatile gelled liquids, i.e. LPG and butane, a capillary viscometer was used.

Figure 1:
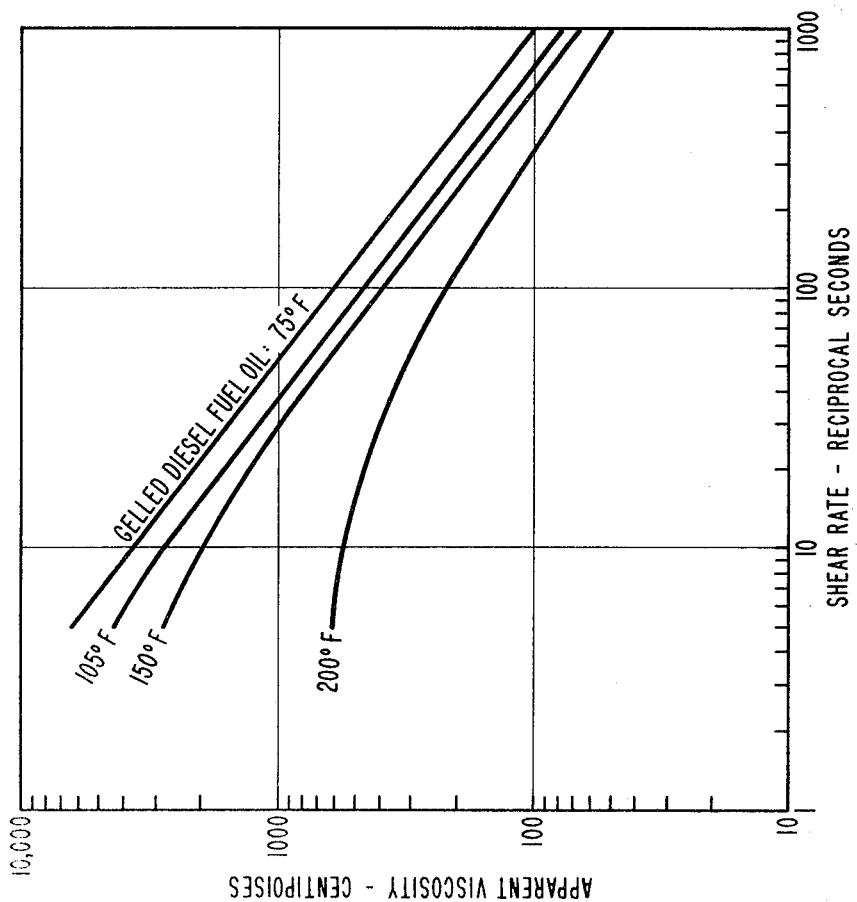

FIG. 1 illustrates the viscosity versus shear rate relationship for gelled diesel fuel oil containing 1.0 weight percent of the two-component gelling agent. These curves were prepared from the test data from test number 5 but are reasonably representative of all of the gelled diesel fuel oils investigated. It is important to note that the CaCl$_2$ had very little effect on the apparent viscosity of the gelled liquid hydrocarbon.

Figure 3:
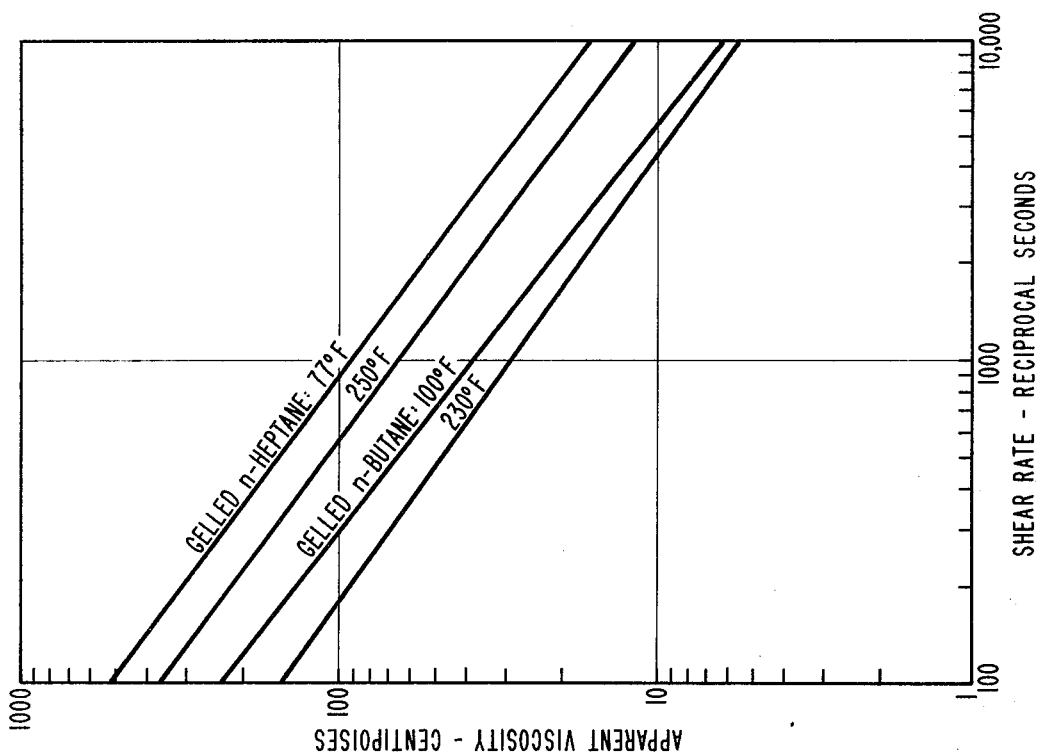
Figure 2:
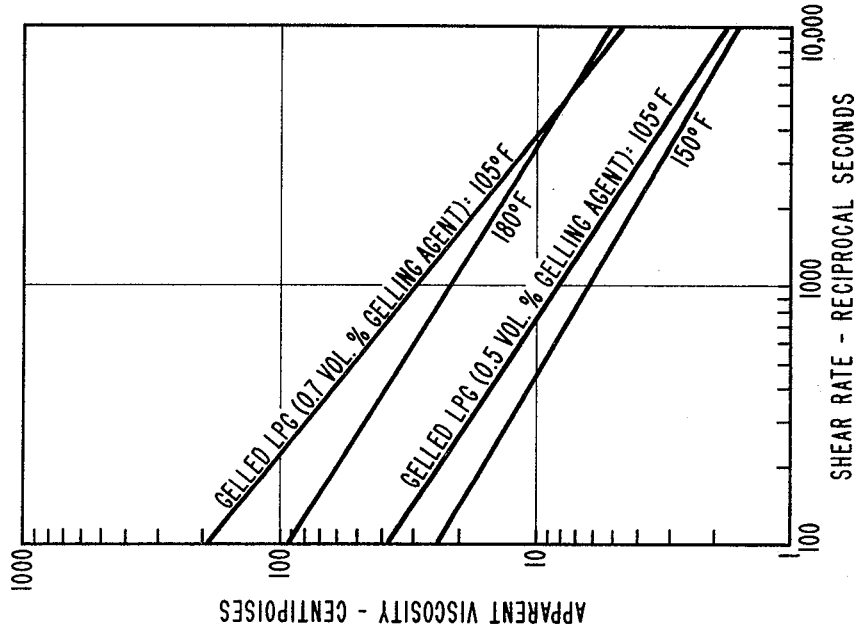

FIGS. 2, 3 and 4 illustrate the apparent viscosity versus shear rate relationships for gelled LPG (test numbers 6 and 7), gelled n-butane and n-heptane (test numbers 8 and 9), gelled kerosene (test number 10), and gelled condensate (test number 11).

The curves of FIGS. 1, 2, 3 and 4 illustrate the shear thinning flow behavior of the gelled liquid hydrocarbons. This type of flow behavior is advantageous when fracturing wells through long injection strings. As the gelled fluid flows through the injection string, the high shear rate on the fluid produces a relatively low apparent viscosity. However, when the fluid enters the fracture, shear rates are less and the apparent viscosity of the fluid increases. The shear thinning flow behavior thus reduce friction loss in the injection string and yet produces wide fractures.

A notable characteristic of the gelled hydrocarbon is their stability at relatively high temperatures. Moreover, the gelled hydrocarbons appear to retain much of their viscosity at high temperatures.

The rheological properties of the gelled fluids determined by the above procedure are useful in calculating the friction loss of the fluid flowing through tubular pipe. The friction loss of the gelled liquid flowing through tubular goods can be calculated by the Metzner and Reed method described in API publication "Recommended Practice Standard Procedures for the Evaluation of Hydraulic Fracturing Fluids," API RP 39, First Edition, 1960. Using this method, the friction loss of gelled diesel fuel oil (test number 2 sample) was found to be about the same as kerosene in the turbulent flow region.

Bottle test conducted on diesel fuel oil samples gelled with about 1.0 volume percent of equal molar concentrations of tributyl borate and lithium alkoxide (2-C$_8$H$_{17}$OLi)

have shown that the gelled composition readily decomposes by the addition of about 1 volume percent of water. The gelled liquid hydrocarbon thus will be returned to its original low viscosity condition upon contacting connate or interstitial water. This feature is particularly important in promoting rapid well cleanup following the fracturing treatment.

The above laboratory tests demonstrate that the gelled liquid hydrocarbons have rheological properties suited for hydraulic fracturing operations. The relatively high viscosity fluids are capable of suspending relatively large quantities of propping agent particles and are capable of generating long and wide fractures; the gelled liquid is stable to relatively high temperatures; because of its shear thinning flow behavior, the gelled liquid can be pumped through the injection string without excessive friction losses; and the decomposition of the gelling agent components in the presence of water promotes rapid well cleanup.

It again should be emphasized that the fracturing method of the present invention can be used to fracture any type of formation, but its main benefit will be realized in the treatment of formations containing water sensitive clays or in the treatment of gas producing formations. Use of a liquid hydrocarbon that vaporizes at formation temperature and pressure is particularly beneficial in the fracturing of gas producing formations. These liquids vaporize into a highly mobile gas which can be readily removed from the formation along with produced gas.

What is claimed is:

1. A method for the hydraulic fracturing of a subterranean formation penetrated by a well which comprises injecting into said formation at a pressure sufficient to open a fracture therein a liquid hydrocarbon containing (a) a gelling agent which includes first alkoxide having the general formula MOR and a second alkoxide having the general formula M'(OR')$_3$ wherein M is selected from the group consisting of Group IA metals, M' is selected from the group consisting of Group IIIA elements, and R and R' are independently selected from the group consisting of $C_1$ to $C_{25}$ hydrocarbyl radicals, said gelling agent being present in a concentration sufficient to substantially increase the viscosity of said liquid hydrocarbon; and (b) a drying agent selected from the group consisting of calcium chloride, zinc chloride, calcium oxide, barium oxide, phosphorus pentoxide, calcium sulfate, sodium sulfate, magnesium sulfate, sodium hydroxide, potassium hydroxide and boric anhydride in an amount sufficient to prevent premature decomposition of said gelling agent.

2. A method as defined in claim 1 wherein the molar ratio of the first alkoxide and a second alkoxide in the liquid hydrocarbon is between 3:1 and 1:3.

3. A method as defined in claim 2 wherein the concentration of the alkoxides in the liquid hydrocarbon is between about 0.25 and 1.25 weight percent.

4. A method as defined in claim 1 wherein R is a $C_8$ to $C_{16}$ hydrocarbon radical.

5. A method as defined in claim 4 wherein M is selected from the group consisting of lithium and sodium.

6. A method as defined in claim 5 wherein MOR is lithium $n$-hexidecyl alkoxide.

7. A method as defined in claim 5 wherein MOR is lithium 2-octyl alkoxide.

8. A method as defined in claim 5 wherein MOR is sodium 2-octyl alkoxide.

9. A method as defined in claim 5 wherein MOR is a lithium alkoxide containing a hydrocarbon radical which comprises primarily a $C_{13}$ alkyl radical.

10. A method as defined in claim 1 wherein M' is selected from the group consisting of boron and aluminum.

11. A method as defined in claim 10 wherein $M'(OR')_3$ is tripropyl borate.

12. A method as defined in claim 10 wherein $M'(OR')_3$ is tributyl borate.

13. A method as defined in claim 1 wherein said liquid hydrocarbon is volatile at formation temperature and pressure.

14. A method as defined in claim 13 wherein said liquid hydrocarbon is seelcted from the group consisting of propane, butane, and liquid petroleum gas.

15. A method as defined in claim 13 wherein the liquid hydrocarbon is a condensate produced from said formation.

16. A method as defined in claim 1 wherein the concentration of the drying agent in said liquid hydrocarbon is between about 0.1 and 3.0 weight percent.

References Cited

UNITED STATES PATENTS

| | | | |
|---|---|---|---|
| 3,056,728 | 10/1962 | Ohtaki | 424—34 X |
| 3,243,270 | 3/1966 | Flanagan | 252—8.55 X |
| 2,876,839 | 3/1959 | Fast et al. | 166—283 |
| 2,620,345 | 12/1952 | Dean | 252—8.55 X |
| 2,982,724 | 5/1961 | Gibson et al. | 252—8.55 |
| 3,012,966 | 12/1961 | Copes et al. | 252—8.55 X |
| 3,615,285 | 10/1971 | Whitney et al. | 44—7 |
| 2,828,265 | 3/1958 | Van Strien | 252—8.55 X |

FOREIGN PATENTS

| | | | |
|---|---|---|---|
| 579,854 | 7/1959 | Canada | 252—8.55 |

HERBERT B. GUYNN, Primary Examiner

U.S. Cl. X.R.

166—283, 308; 252—316